Nov. 23, 1965   J. LERNER   3,218,841
CALIBRATING EQUIPMENT FOR MOISTURE INDICATOR
Filed Oct. 10, 1962   2 Sheets-Sheet 1

INVENTOR.
JULIUS LERNER
BY George L. Church
ATTORNEY

Nov. 23, 1965  J. LERNER  3,218,841
CALIBRATING EQUIPMENT FOR MOISTURE INDICATOR
Filed Oct. 10, 1962                                    2 Sheets-Sheet 2

INVENTOR.
JULIUS LERNER
BY George L. Church
ATTORNEY

… … …

United States Patent Office 3,218,841
Patented Nov. 23, 1965

3,218,841
CALIBRATING EQUIPMENT FOR MOISTURE INDICATOR
Julius Lerner, Broomall, Pa., assignor to Sun Oil Company, Philadelphia, Pa., a corporation of New Jersey
Filed Oct. 10, 1962, Ser. No. 229,678
4 Claims. (Cl. 73—1)

This invention relates to calibrating equipment for a stream moisture indicator, and more particularly to portable equipment, usable in the field, for establishing or checking the slope of the response curve (moisture curve) of a capacitive-type stream moisture indicator.

In using a "Stream Moisture Indicator" of the type disclosed in my copending but now abandoned application, Serial No. 104,874, filed April 24, 1961, a problem has arisen in calibrating or checking the instrument in the field, i.e., after it has been installed to continuously monitor (measure) the moisture in a stream such as a refinery stream. At present, this can be done only by comparing the instrument readings with data from laboratory tests using samples drawn from the stream, the laboratory tests using so-called "Karl Fischer" equipment. However, this procedure has several shortcomings. In the first place, laboratory analysis becomes very difficult when the moisture content of the stream is on the order of 15 to 25 parts per million. In the second place, extreme care must be exercised in drawing the sample; for example, in a 50 cc. sample, one drop of water represents about two thousand parts per million. In the third place, a long period of time can elapse before there is enough change in the moisture content of the stream to result in test points with enough spread between them for calibration purposes.

Because of the shortcomings previously mentioned, it has been customary in many cases not to bother with calibrating or checking the instrument in the field, but instead to rely to a great extent, for calibration, on the data obtained with shop test facilities, when the instrument is first assembled. Through the use of such shop test facilities, the value of instrument capacitance corresponding to zero moisture of the stream can be established fairly closely, as can also the slope of the moisture curve (response curve), this slope being the change in instrument capacitance per unit change of stream moisture content. The equipment to be described will enable the establishing or checking, in the field, of the slope of the moisture curve of a capacitive-type stream moisture indicator (stream moisture recording instrument).

According to this invention, a wet (water-saturated) liquid, having a known moisture content, is injected at a known rate into the sample stream which is flowing to and through the stream moisture recording instrument to be calibrated. The resulting actual offset or deflection on the record chart is noted, and if the flow rate of the stream through the instrument is known, the amount of the increase in the moisture content of the stream (which increase caused the offset or deflection) can be calculated. The supply of wet liquid (which is injected into the sample stream), together with the injecting means itself, is designed to comprise a portable unit.

A detailed description of the invention follows, taken in conjunction with the accompanying drawings, wherein.

Figure 1:
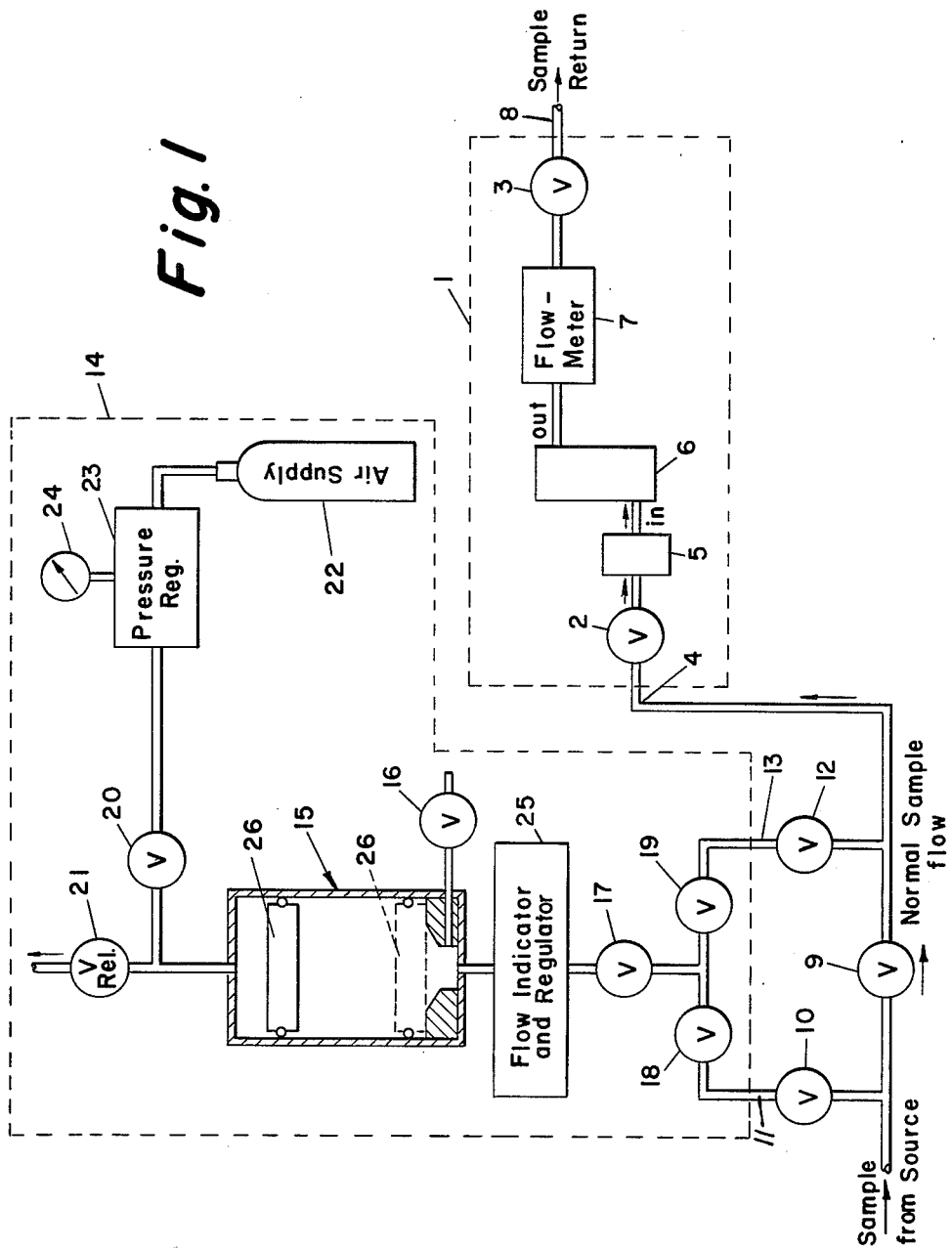
FIG. 1 is a schematic diagram of calibrating equipment according to this invention, illustrated in conjunction with a stream moisture recording instrument.

Refer first to FIG. 1. The equipment in block 1 is a desiccant-type stream moisture recording instrument (or monitor), as used in the field to continuously measure moisture in the low parts per million range. Valves 2 and 3 are shut-off and metering valves. A sample of a stream whose moisture is to be measured or monitored is fed from a source by line 4 through valve 2, through a filter 5, through a desiccant-type sensor 6, and thence through a flowmeter 7 and the valve 3 to a line 8, by means of which the sample is returned to the sample source.

Figure 2:
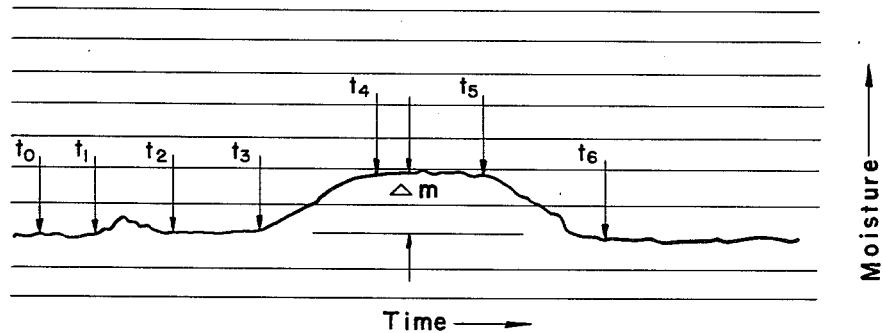
FIG. 2 is a typical record obtained during calibration of the stream moisture recording instrument.

The sensor 6 is preferably the type illustrated in my aforesaid abandoned application, and specifically in FIG. 2 of such application. As disclosed in the prior application, sensor 6 is of the capacitive type, and is connected to suitable capacitance-measuring circuitry whose output is fed to a recorder which records moisture content of the sample stream with respect to time.

The flowmeter 7 measures the flow rate of the entire stream which flows through the sensor or cell 6.

The use of the calibration equipment of this invention requires the addition of a valve 9 in line 4; this valve is normally open and the sample normally flows therethrough. Also, a valve 10 must be added in a branch line 11 which branches off from line 4 upstream of valve 9. Similarly, a valve 12 must be added in a branch line 13 which branches off from line 4 downstream of valve 9. Valves 9, 10, and 12 may be termed "block valves."

Block 14 contains the equipment (portable unit) needed to calibrate the moisture recording instrument 1. The equipment in block 14 may be considered as comprising two sub-groups. The first sub-group includes a cylinder assembly 15 with its related valves 16, 17, 18, 19, 20, and 21, and flow indicator 25. Valve 16 may be termed a charging valve, valve 17 may be termed a calibrating sample valve, and valve 20 may be termed a shut-off valve. Valve 21 is a pressure relief or safety valve.

The second sub-group comprises a gas supply with its associated indicators and regulators. For purposes of illustration, a bottle 22 of compressed air is shown, feeding through a pressure regulator 23 having associated therewith a pressure-indicating gauge 24. Although compressed air is shown, so-called "plant air," or any convenient bottled gas, could be used instead. Alternatively, a liquid under pressure could be used.

A piston 26 fits tightly in cylinder 15, but is arranged for sliding movement therein in response to certain forces, as will hereinafter appear.

In the laboratory or shop, the equipment comprised in the first sub-group above, with piston 26 in the dotted-line position, is inverted, so that valve 21 is pointing down. Valve 20 is closed. A prepared sample of water-saturated benzene, having a known moisture content, is connected to charging valve 16. At this time, before connection in the field, valves 18 and 19 are not connected to lines 11 and 13, but the valves 17, 18, and 19 are in communication with each other as shown. Also, at this time, valve 20 is not connected to unit 23. Valves 16, 17, 18, and 19 are opened, and the saturated benzene is permitted to flow. Since valve 20 is closed, piston 26 cannot move, and the benzene will flow through valve 16, through flow indicator and regulator 25, and through valves 17, 18, and 19 to atmosphere. In this connection, it will be noted that one side of valve 16 is coupled to the end of cylinder 15 adjacent the dotted-line position of piston 26, and also that one side of valve 17 is coupled to the same end of this cylinder, by way of flow indicator and regulator 25. At this time, also, the side of valve 18 remote from valve 17 is connected to atmosphere, while the side of valve 19 remote from valve 17 is also connected to atmosphere.

When enough benzene has flowed to ensure the removal of all contaminant from charging valve 16, flow indicator and regulator 25, and calibrating sample valve 17, valves 17, 18, and 19 are closed, and valve 20 is opened to atmosphere. The air trapped in cylinder 15 can now flow out through valve 20, and the piston 26 will then move from its dotted-line position to its solid-line position, and the cylinder 15 will fill with saturated benzene. When it has filled sufficiently, valve 16 is closed, and the benzene supply is disconnected. The cylinder 15 then comprises a container of saturated (wet) benzene.

The portable equipment in block 14 (to wit, the calibrating equipment) is then transported to the field location (i.e., the location of valves 10 and 12). Cylinder 15 is positioned so that valve 21 is pointing upwardly. Then, one side of valve 18 is connected to branch line 11, and one side of valve 19 is connected to branch line 13. Also, the gas supply (air supply) sub-group is connected to the cylinder sub-group, by connecting pressure regulator 23 to valve 20. As previously indicated, for normal operation of the moisture instrument, valve 9 is open and valves 10 and 12 are closed. This results in "normal sample flow" in the direction indicated.

To calibrate, valves 10, 12, 18, and 19 are first opened, following which valve 9 is closed. This causes sample flow to take place through valve 10, branch line 11, valve 18, valve 19, branch line 13, valve 12, and line 4, to instrument 1.

FIG. 2 is an example of a record (strip chart) produced, during calibration, by the recorder which is connected to instrument 1. The horizontal axis (X-axis) represents time, and the vertical axis (Y-axis) represents percent of recorder pen deflection, or moisture content of the sample stream.

During normal operation of the moisture instrument (with valve 9 open and valves 10 and 12 closed), the record would be running at a moisture content as indicated at time $t_0$. At time $t_1$, valves 10, 12, 18, and 19 are opened, and valve 9 is closed, thereby diverting the sample stream to flow through the calibrating equipment including valves 18 and 19, etc. The offset reading following this time $t_1$ would probably occur because of moisture in the lines 11 and 13. This could be great enough to even drive the recorder off scale, but eventually, the stream will return to its normal value of moisture content and the recorder will stabilize, as illustrated at time $t_2$. A base line is established following time $t_2$, by letting the sample flow through the calibrating equipment 14. The flow rate should be set so that the flowmeter 7 (indicating total flow through the moisture recording instrument 1) indicates about 10 gals./hr.

At time $t_3$, valves 17 and 20 are opened, and the pressure regulator 23 is set so that a flow rate (of air from bottle 22) of about 24 cc./min. is obtained. The air, flowing through unit 23 and valve 20, forces piston 26 downwardly, injecting wet benzene from cylinder 15 through flow indicator and regulator 25 and through valve 17 into the sample stream flowing between valves 18 and 19, this water-saturated benzene being carried along to the instrument 1 with the sample. Therefore, following or to the right of time $t_3$, the record (FIG. 2) will show a gradual increase in moisture (water) content and will eventually level off, as at time $t_4$.

After time $t_4$, when the record has run level for a reasonable time, the unit 14 could be revalved, by closing valves 17 and 20, but if no one is watching it, piston 26 will keep moving down in cylinder 15 until it reaches the dotted-line position (FIG. 1) at time $t_5$ (FIG. 2). When piston 26 is in the dotted-line position, it is at the effective bottom of the cylinder 15, so that it cannot move any further downwardly, and consequently cannot force any more wet benzene out of the cylinder through unit 25 and valve 17 and into the sample stream flowing to instrument 1. Since wet benzene will then no longer be added to the main sample stream, this stream will dry out, and the FIG. 2 record will indicate decreasing moisture, until time $t_6$ is reached.

The revalving of the unit 14 previously referred to (after time $t_4$) could also include (to effect a complete revalving) the opening of valve 9 and the closing of valves 10, 12, 18, and 19.

The offset $\Delta m$, the vertical distance between the base line established between times $t_2$ and $t_3$ and the "level" immediately following time $t_4$, represents the increase in the moisture content of the stream due to the injection of the wet benzene into the sample stream. It is important to read (by means of flow indicator 25) the flow rate of the wet benzene from the container 15 into the sample stream, and also to read (by means of flowmeter 7) the flow rate of the entire stream through the cell 6. Knowing these two flow rates, and also the moisture content of the saturated benzene, the actual increase in moisture content of the stream (represented in FIG. 2 by offset $\Delta m$) can be calculated.

In connection with the measurement of the flow rate of the wet benzene, it is pointed out that the flow rate of the injected (wet) sample itself is being measured at 25. This injected sample is a liquid and for all practical purposes is incompressible; therefore, no correction for pressure has to be made.

The "zero" of the instrument 1 can now be set from previously-obtained test data; this does not change. The "span" of this instrument (establishing the moisture curve) can now be set from the calibration data just obtained by means of the calibrating equipment 14 of this invention.

Normally (assuming the unit 14 has not been revalved), when the piston 26 reaches its dotted-line position at the bottom of the cylinder 15, the air flow will stop, due to the buildup of the pressure in cylinder 15 to the value set by regulator 23. However, as a precaution against regulator failure, the safety (pressure relief) valve 21 is added. This will provide pressure relief in the event that the pressure in cylinder 15 tends to become excessive.

Piston 26 can be moved (to inject wet benzene into the sample stream) by means other than pneumatic or hydraulic. For example, a worm gear driving a rack, and driven in turn by an electric motor, could move this piston at a constant rate.

The calibrating equipment of this invention provides several advantages, which will now be set forth. In the first place, the equipment permits calibrating to be effected with little or no danger of sample contamination. The benzene used mixes well with other hydrocarbons such as would ordinarily be found in the sample stream; also, benzene is the hydrocarbon which can dissolve the highest percentage of water. In the next place, this calibrating equipment provides complete control of the time element; that is to say, tests may be run whenever the operator wishes. Next, once it is started, the test needs no operator to stand by, since it proceeds automatically to its conclusion. The test data is provided in the form of a permanent record such as that illustrated in FIG. 2, and this can be read at any time.

Figure 3:
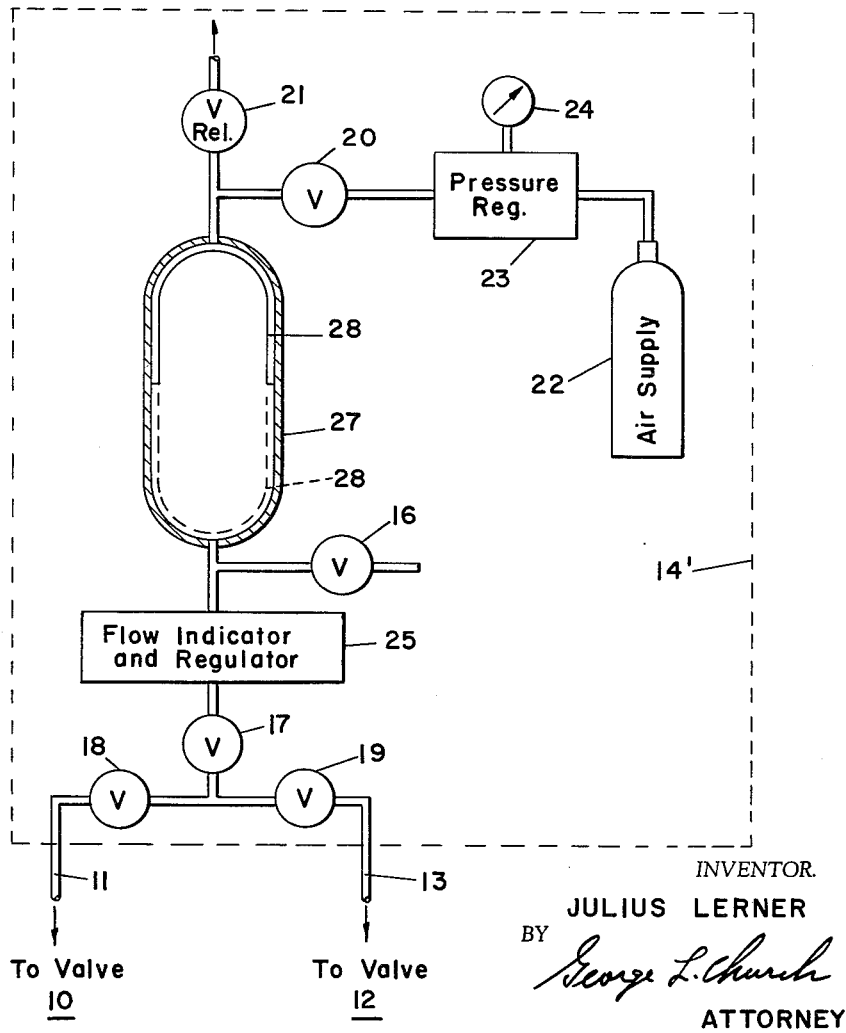
FIG. 3 is a schematic diagram of another (and generally preferred) embodiment of calibrating equipment according to this invention.

FIG. 3 illustrates another embodiment of calibrating equipment according to this invention. In this figure, elements the same as those of FIG. 1 are denoted by the same reference numerals. In the calibrating equipment 14' of FIG. 3, the cylinder 15 of FIG. 1 has been replaced by an accumulator 27. Approximately centrally of the length of accumulator 27, an imperforate slack diaphragm 28 is sealingly mounted at its edges within the accumulator. The slack diaphragm 28 functions, in accumulator 27, to separate the wet sample (saturated benzene) from the driving gas (e.g., air), in the same manner as does piston 26 in cylinder 15 (FIG. 1).

In FIG. 3, the solid line 28 represents the position of the slack diaphragm at the beginning of a test or calibration (i.e., with the accumulator 27 full of wet benzene), while the dotted line 28 represents the position of this same diaphragm at the end of a test (i.e., when the accumulator 27 has been emptied of wet benzene).

In FIG. 3, the sequence of operation is exactly the same as that previously described in connection with FIG. 1. Assuming that accumulator 27 is filled with wet benzene (the diaphragm 28 then being in the solid-line position), when a test is desired to be made air is admitted from supply 22 to the upper end of accumulator 27, forcing the slack diaphragm 28 to move from the solid-line position to the dotted-line position. This injects the wet benzene from the accumulator into the sample stream, by way of flow indicator and regulator 25 and also valve 17.

The invention claimed is:

1. In the calibration of a stream moisture recording instrument, the steps of continuously feeding a sample stream through said instrument, injecting a water-saturated liquid of known water content into the sample stream ahead of said instrument, measuring the rate of injection of said liquid, and measuring the rate of liquid flow through said instrument.

2. In the calibration of a stream moisture recording instrument, the steps of continuously feeding a sample stream through said instrument, injecting water-saturated benzene into the sample stream ahead of said instrument, measuring the rate of injection of such benzene, and measuring the rate of liquid flow through said instrument.

3. A system for calibrating a stream moisture recording instrument connected to a liquid sample line comprising means for injecting at a known rate, into said sample line, a water-saturated liquid of known water content, and means for measuring the rate of liquid flow through said instrument, the rate of injection, said liquid flow rate, and the value of water content of said liquid enabling calculation of the increase in the moisture content of the liquid in said line during the injection.

4. System as defined in claim 3, wherein said liquid is water-saturated benzene.

References Cited by the Examiner
UNITED STATES PATENTS 2,526,636  10/1950  Colman.
3,028,744   4/1962  Bagwell et al. _____ 73—3

ISAAC LISANN, *Primary Examiner.*